(12) United States Patent
Charpentier et al.

(10) Patent No.: US 9,965,753 B2
(45) Date of Patent: May 8, 2018

(54) SCANNER IMAGE ROUTING (SIR)

(71) Applicant: NCR Corporation, Duluth, GA (US)

(72) Inventors: Peter R. Charpentier, Suwanee, GA (US); Jason Rambler, Decatur, GA (US)

(73) Assignee: NCR Corporation, Atlanta, GA (US)

( * ) Notice: Subject to any disclaimer, the term of this patent is extended or adjusted under 35 U.S.C. 154(b) by 174 days.

(21) Appl. No.: 14/814,571

(22) Filed: Jul. 31, 2015

(65) Prior Publication Data
US 2017/0032347 A1  Feb. 2, 2017

(51) Int. Cl.
*G06Q 20/20* (2012.01)
*G07F 7/08* (2006.01)
*G06K 9/00* (2006.01)
*H04N 1/21* (2006.01)

(52) U.S. Cl.
CPC ......... *G06Q 20/20* (2013.01); *G06K 9/00442* (2013.01); *G07F 7/0886* (2013.01); *H04N 1/21* (2013.01)

(58) Field of Classification Search
CPC ... G06Q 20/20; G07F 7/0886; G06K 9/00664
USPC ........................................................ 382/137
See application file for complete search history.

(56) References Cited

U.S. PATENT DOCUMENTS

| | | | |
|---|---|---|---|
| 2004/0143571 A1* | 7/2004 | Bjornson | .......... G06F 17/30445 |
| 2005/0131820 A1* | 6/2005 | Rodriguez | ............. G06Q 20/04 705/42 |
| 2009/0016594 A1* | 1/2009 | Blaikie | ................... G07D 7/00 382/139 |

* cited by examiner

*Primary Examiner* — Amandeep Saini
(74) *Attorney, Agent, or Firm* — Schwegman, Lundberg & Woessner

(57) ABSTRACT

A scanner recognizes types of images and components of those image types. Custom routing rules are applied against the types and components and the scanner utilizes multiple network connections to route the images and components to destinations within a Point-Of-Sale (POS) terminal and external to the POS terminal over a Wide-Area Network (WAN) and/or a Local-Area Network (LAN).

20 Claims, 4 Drawing Sheets

SCANNER IMAGE ROUTING (SIR)

BACKGROUND

Point-Of-Sale (POS) terminal devices often include a variety of integrated devices, such as scanners, scales, integrated scanners with scales, card readers with on-screen signature capabilities, and the like.

The scanner has become increasingly useful to retails because it can provide a variety of functionality beyond just a typical barcode scan. For instance, a scanner can take a picture of a check that is being cashed, a driver's license offered as form of identification for the check, and even images of customers while at the scanner As more and more types of images are captured by scanners, retailers are concerned about the security of the images and the vulnerability to data sensitive images being misused. There is also an issue as to what to do with the images captured; that is, where are the images to go for processing and/or storing are.

Each retailer wants to custom control what security and what processing occurs on different types of images that there scanner processes; however, they lack the ability to have such custom control with current scanner implementations.

In fact, retailers would like the ability to route different component pieces of an image to different locations for security reasons. For example, a scanned driver's license is currently shown to a cashier as an image on the POS from the scanner but the cashier really only needs to see the name and address of the driver's license to compare with the check being cashed and there is no reason why the cashier needs to see the driver's license number (although the cashing bank may require the driver's license number for cashing the check). Presently, the cashier does see the driver's license number and any other sensitive information that may be on the driver's license, such as medical condition and the like.

Therefore, what is needed is customizable scanner image routing.

SUMMARY

In various embodiments, methods and a scanner for customized image routing are provided.

According to an embodiment, a method for scanner imaging routing is provided. Specifically.

DETAILED DESCRIPTION

Figure 1:
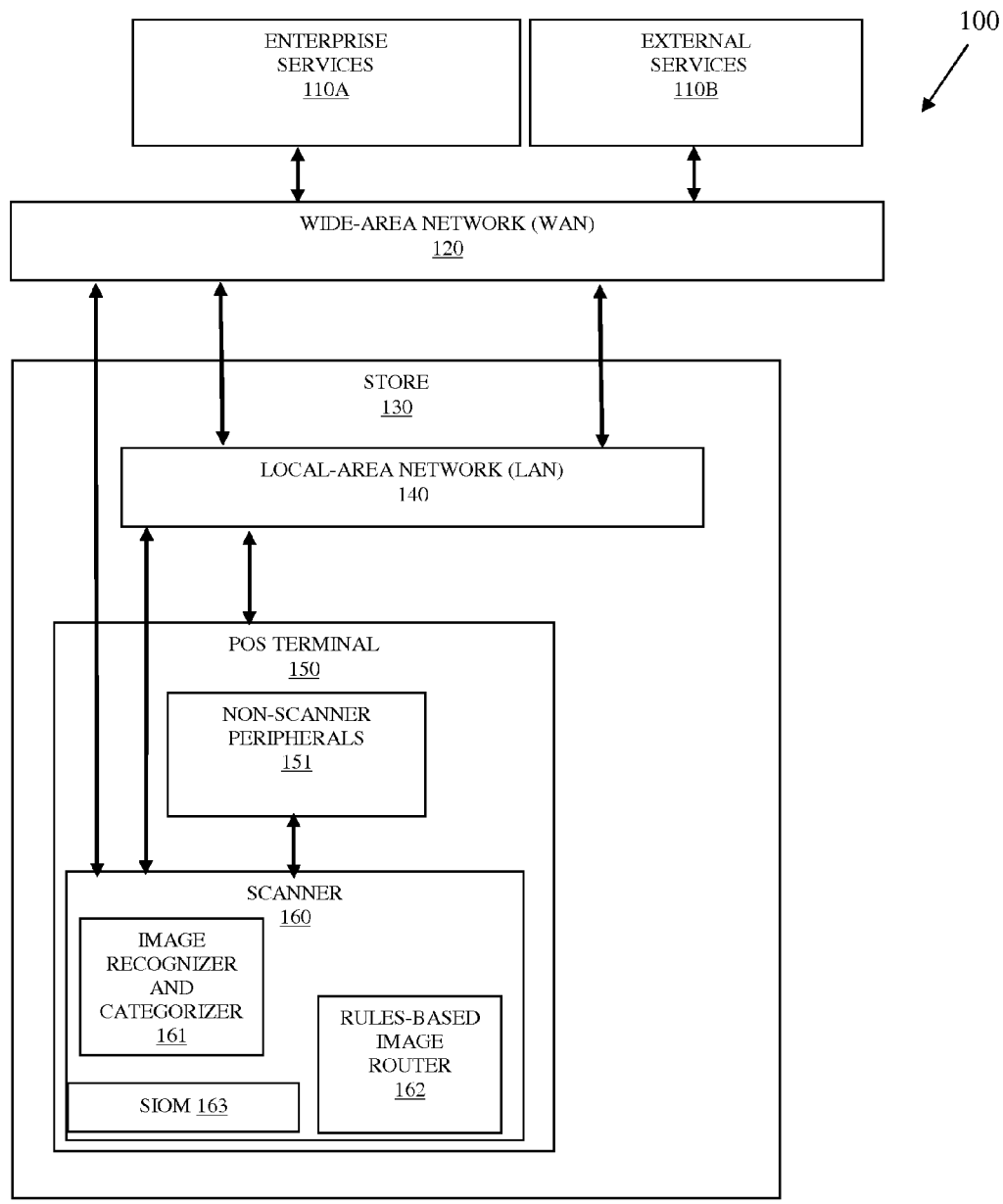
FIG. 1 is a diagram illustrating a system for practicing custom scanner image routing, according to an example embodiment.

FIG. 1 is a diagram illustrating a system 100 for practicing customized scanner image routing, according to an example embodiment. It is to be noted that the POS terminal 150 is shown schematically in greatly simplified form, with only those components relevant to understanding of the embodiments being illustrated. The same situation may be true for the other various components of the POS terminal 150 and the network scanner 160.

Furthermore, the various components (that are identified in the FIG. 1) are illustrated and the arrangement of the components is presented for purposes of illustration only. It is to be noted that other arrangements with more or less components are possible without departing from the teachings of customized scanner image routing, presented herein and below.

Moreover, the methods and scanners 160 and 170 presented herein and below (for customized scanner image routing) may include all or some combination of the components shown with the FIG. 1. The methods are programmed as executable instructions in memory and/or non-transitory computer-readable storage media and executed on one or more hardware processors associated with the components/devices.

Specifically, the FIG. 1 a POS terminal 150 is connected to a Local-Area Network (LAN) 140 within a store 130. The LAN 140 includes one or more connections to a Wide-Area Network (WAN) 120 for accessing remotely located network services that are controlled by a retailer of the store (enterprise services 110A) and that our third-party services not under the control of the retailer (external services 110B). The store 130 includes two types of scanners that can be used by the POS terminal 150. An integrated scanner 160 that is integrated within the POS terminal 150 and a network scanner 170 that is accessible to the POS terminal 150 over the LAN 140. The POS 150 terminal includes a variety of non-scanner peripherals 151 (such as touchscreen display, multiple displays, keyboard, card reader, receipt/coupon printer, keyboard, currency acceptor, currency dispenser, and others). The POS terminal 150 also includes an integrated scanner 160.

The scanner 160 includes normal scanner functions to scan bar codes and report the barcodes to the POS terminal 150 during a transaction. The scanner 160 is enhanced to take images of a variety of other types of documents and/or individuals at the POS terminal 150 during any given transaction.

The scanner 160 includes an image recognizer and categorizer 161, a rules-based router 162, and optionally a Secure/Input Output Module (SIOM) 163.

A SIOM 163 is an independent processing environment having its own chipset, network capabilities, operating system, memory, and storage that are completely independent from that which is associated with the scanner 160 but the SIOM 163 is integrated into the motherboard of the scanner 160. The SIOM 163 controls secure communication sessions (via custom encrypted session) made to the scanner 160 and data sent from the scanner 160 and performs authentication for security on the scanner 160 and authentication on the recipient devices of routed image data from the scanner 160. The SIOM 163 is optional and is provided as one embodiment for the scanner 160.

The scanner 160 connects within the POS terminal 150 through a Universal Serial Bus (USB) port to one or more of the non-scanner peripherals 151. The scanner 160 is also equipped with an Ethernet port for a direct connection from the scanner 160 to the WAN 120. Moreover, in an embodiment, the scanner 160 may include an additional Ethernet port for a direct connection from the scanner 160 to the LAN 140 to bypass the POS terminal 150. In some cases a single Ethernet port integrated in the scanner 160 may be connected to a switch that provides direct access from the scanner 160 to either the WAN 120 or the LAN 140.

The scanner 160 includes an image recognizer and categorizer 161. The scanner 160 captures an image at the POS terminal 150 during a transaction and the image recognizer and categorizer 161 analyzes predefined key pixel points and areas of the captured image to compare against known templates for types of images, such as checks, barcodes, identification cards, loyalty cards, faces of operators of the scanner 160, and the like. When a compare is made based on a scoring approach between the key pixel points and areas in the captured image when compared to the known templates, the scanner 160 categorizes the image into a specific type of image.

The categories can be hierarchical as well and include sub-category types such as identification cards may include: a passport, a driver's license, school identification, work identification, a government identification, etc.

Moreover, in an embodiment, one a known category is assigned to the received image by the scanner 160 a different set of key pixel points and areas along with different templates can be compared by the image recognizer and categorizer 161 (again using a scoring approach) to identify component portions of the image, such as a name, an address, a social security number, a driver's license number, a bank routing number, a bank account, a passport number, and the like.

In an embodiment, the image recognizer and categorizer 161 can also drill down into the component portions of the image and perform Optical Character Recognition (OCR) on some component portions to retrieve text representing actual content for specific component portions.

Once the image recognizer and categorizer 161 has classified, sub-classified, identified any component portions, and OCR'd those component portions into text content, the image recognizer and categorizer 161 passes this information along to the rules-based image router 162.

The rules-based image router 162 includes a plurality of custom defined rules (which can be customized by each retailer), that identifies the image classification (and/or sub-hierarchical classifications), the component portions of the image, and any text content and matches this to one or more routing destinations for the image as a whole, for the component portions of the image, and/or for the text content (if present).

It is to be noted that a single image processed by the image recognizer and categorizer 161 and the rules-based image router can have different component parts and different text content routed to different and multiple destination resources (one or more of the non-scanner peripherals 151, services residing on the LAN 140 (not shown in the FIG. 1), the enterprise services 110A, and/or the external services 110B. The custom rules define such a scenario.

For example, suppose a customer is cashing a check and needs to show a driver's license. The check and the driver's license are scanned at the scanner 160 during the POS terminal 150 transaction. The image recognizer and categorizer 151 categories and decomposes the check and the driver's license into component portions. The rules-based image router then sends the name of the customer, an image of the customer's face from the driver's license, and the amount being cashed to a display (one type of non-scanner peripheral 151) for viewing by a cashier and verification with the name on the check. The driver's license number from the driver's license and expiration date obtained from the driver's license image along with the check number, check amount, and bank routing information from the check image are all sent to the external services 110B to route to the cashing bank for approval.

This provides the cashier with just the information that the cashier needs to verify that the customer is who is cashing the check and that the check is his and provides security for the customer should the cashier have nefarious intentions if being able to see sensitive information of the customer. Moreover, the routing from the rules-based image router 162 to the WAN can be encrypted to provide security over the network wire. Still further, the cashing bank receives what it needs to make a real time decision as to whether the check should be cashed or not and the approval or denial can be sent in real time to the cashier operating the POS terminal 150.

This is but one example scenario and a variety of others may exists as well and the invention is not intended to be limited to just this example. In fact, any scanner that classifies images and custom routes (based on custom defined rules by a retailer) the whole image and/or portions of that image to one or more destinations is intended to fall within the beneficial scope of the embodiments presented herein.

In an embodiment, as described above, the actual data transmission of the image and/or its component portions/parts can be achieved by the rules-based image router 162 through the network connections that the scanner 160 is equipped with, such as USB, Ethernet, Dual Ethernet, Ethernet connected to a switch and the like.

In an embodiment, the SIOM 163 securely controls all data coming into and moving out of the scanner 160. In this embodiment, the rules-based image router 162 provides the image and/or portions of the image and instructs the SIOM 163 to establish secure communication sessions with the necessary destination resources and deliver the image and/or portions of the image to those destination resources over the secure communication sessions. It is noted that the rules-based image router 162 determines the route (destination resources) and the SIOM 163 provides a secure mechanism for delivering the data to those destination resources.

The techniques presented herein allow retailers to route images and even portions of an image to their POS terminals over USB or over Ethernet to local in store resources or to external retail resources or third-party external resources.

The images or even video streams are sent to specific locations based on pre-defined settings, which can be custom defined by the retailer through a rules-based approach as discussed above.

The customized scanner image routing provides a logical flow of information based on a set of parameters associated to an event or a transaction. That is, in some cases event raised by the non-scanner peripherals 151 can assist the image recognizer and categorizer 161 and the rules-based image router. Events detected can include: cashier sign-on, item scanning, check tendering, item not on file, layaway, returns, etc. Each transaction type is tagged and identified as sending the information to the POS terminal 150 over USB or to services over Ethernet (as described above in detail) for subsequent processing needed or desired by the retailer or for the transaction at the POS terminal 150.

For example, a check transaction tender event may route the images for OCR processing and present the text to the POS terminal for processing.

In another case, a retailer may want normal images that are scanned routed through an Ethernet port and set to an outside server of cloud service for security review.

The point is the scanner does the image categorization, decomposition, and custom routing based on custom defined rules supplied by a retailer based on the needs of that retailer.

In an embodiment, the POS terminal 150 is a SST operated by a customer.

In an embodiment, the SST is an Automated Teller Machine (ATM).

In an embodiment, the SST is a kiosk.

In an embodiment, the POS terminal 110 is a cashier-operated terminal.

These and other embodiments are now discussed with reference to the FIGS. 2-4.

Figure 2:
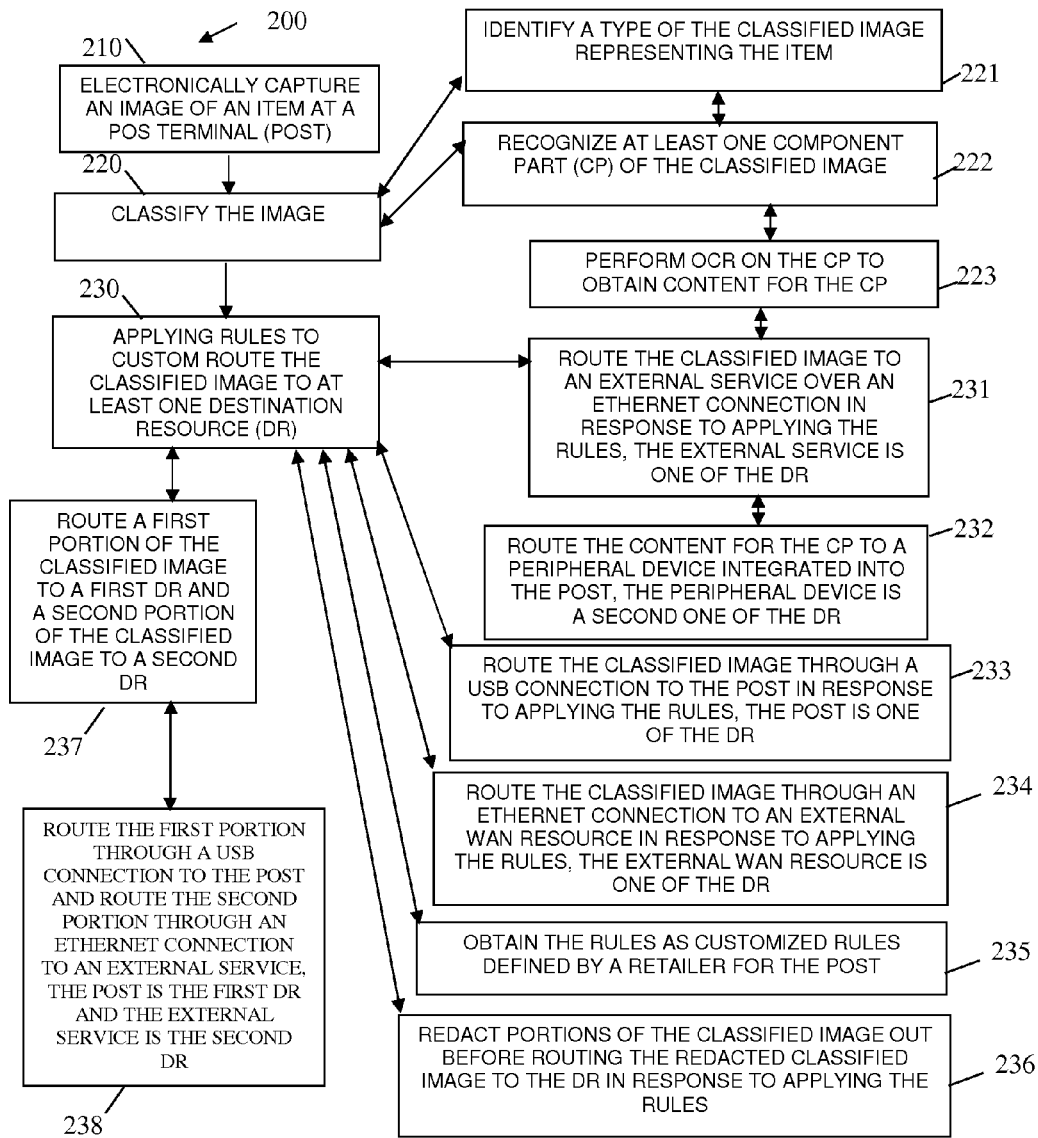
FIG. 2 is a diagram of a method for customized scanner image routing, according to an example embodiment.

FIG. 2 is a diagram of a method 200 for customized scanner image routing, according to an example embodiment. The software module(s) that implements the method 200 is referred to as a "scanner image routing manager." The scanner image routing manager is implemented as executable instructions programmed and residing within memory and/or a non-transitory computer-readable (processor-readable) storage medium and executed by one or more processors of a scanner. The processor(s) of the scanner that executes the scanner image routing manager are specifically configured and programmed to process the scanner image routing manager. The scanner image routing manager has access to multiple networks during its processing. The networks can be wired, wireless, or a combination of wired and wireless.

In an embodiment, the processing of the scanner image routing manager occurs within the scanner 160 of the FIG. 1.

In an embodiment, the processing of the scanner image routing manager is the image recognizer and categorizer 161 and the rules-based image router 162.

In an embodiment, the processing of the scanner image routing manager occurs within the POS terminal 150. In an embodiment, the POS terminal 150 is a SST. In an embodiment, the SST is an ATM. In an embodiment, the SST is a kiosk. In an embodiment, the POS terminal 150 is a casher-assisted terminal.

At 210, the scanner image routing manager electronically captures an image of an item at a POS terminal. This can be triggered by an action of a customer or an action of a cashier. In some cases, the scanner can electronically capture the image on its own based on settings and events raised from the POS terminal, such as images of customer faces, etc.

At 220, the scanner image routing manager classifies the image. This can be achieved in a variety of manners.

For example, at 221, the scanner image routing manager identifies a type of classified image representing the item. This can be done with any pixel sampling, scoring, and predefined template approach. One of which was discussed above with reference to the discussion of the FIG. 1.

In an embodiment of 221 and at 222, the scanner image routing manager recognizes at least one component part of the classified image. Again, once the type is known pixel sampling, scoring, and other templates can be processed to identify component parts of a particular type of image.

In an embodiment of 222 and at 223, the scanner image routing manager performs OCR on the at least one component part to obtain text content from the at least one component part.

At 230, the scanner image routing manager applies rules for custom routing the classified image to at least one destination resource (software or hardware resource). The at least one destination resource is external to the scanner that processes the scanner image routing manager.

In an embodiment of 223 and at 231, the scanner image routing manager routes the classified image to an external service over an Ethernet connection in response to applying the rules. The external service is one of the at least one destination resources.

In an embodiment of 231 and at 232, the scanner image routing manager routes the content for the at least one component part to a peripheral device integrated into the POS terminal. The peripheral device is a second one of the at least one destination resources.

In an embodiment of 230 and at 233, the scanner image routing manager routes the classified image through a USB connection to the POS terminal in response to applying the rules. The POS terminal is one of the at least one destination resources.

In an embodiment of 230 and at 234, the scanner image routing manager routes the classified image through an Ethernet connection to an external WAN resource in response to applying the rules. The external WAN resource is one of the destination resources.

According to an embodiment of 230 and at 235, the scanner image routing manager obtains the rules as customized rules defined by a retailer for the POS terminal.

In an embodiment of 230 and at 236, the scanner image routing manager redacts portions of the classified image out before routing the redacted classified image to the at least one destination resource in response to applying the rules. Here, the rules may indicate that sensitive information should be redacted out before the image is routed for security reasons.

In an embodiment of 230 and at 237, the scanner image routing manager routes a first portion of the classified image to a first destination resource and a second portion of the classified image to a second destination resource.

In an embodiment of 237 and at 238, the scanner image routing manager routes the first portion through a USB connection to the POS terminal and routes the second portion through an Ethernet connection to an external service. The POS terminal is the first destination resource and the external service is the second destination resource.

Figure 3:
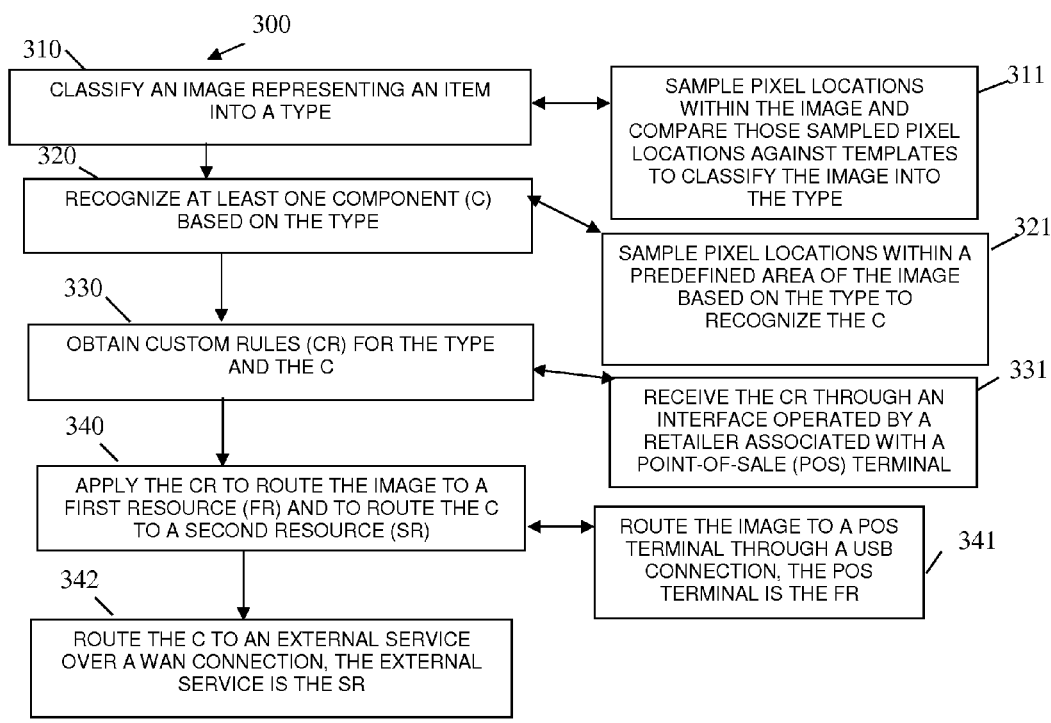
FIG. 3 is a diagram of another method for customized scanner image routing, according to an example embodiment.

FIG. 3 is a diagram of another method 300 for customized scanner image routing, according to an example embodiment. The software module(s) that implements the method 300 is referred to as a "customized image router." The customized image router is implemented as executable instructions programmed and residing within memory and/or a non-transitory computer-readable (processor-readable) storage medium and executed by one or more hardware processors of a POS terminal. The processors that execute the POS assistance manager are specifically configured and programmed to process the customized image router. The customized image router has access to multiple networks during its processing. Each network can be wired, wireless, or a combination of wired and wireless.

The customized image router depicts another view and in some ways enhanced processing from that which was described above with respect to the FIG. 2.

In an embodiment, the processing of the customized image router occurs within a scanner. In an embodiment, the scanner is the scanner 160 of the FIG. 1.

In an embodiment, the scanner is integrated into a POS terminal. In an embodiment, the POS terminal is the POS terminal 150 of the FIG. 1. In an embodiment, the POS terminal 150 is a SST. In an embodiment, the SST is an ATM. In an embodiment, the SST is a kiosk. In an embodiment, the POS terminal 150 is a casher-assisted terminal.

In an embodiment, the processing of the customized image router is the image recognizer and categorizer 161 and the rules-based image router 162.

At 310, the customized image router classifies the image representing an item into a type or a category.

According to an embodiment, at 311, the customized image router samples pixel location within the image and compares those sampled pixel locations against one or more templates to classify the image into the type.

At 320, the customized image router recognizes at least one component of the image based on the classified type for the image.

In an embodiment, at 321, the customized image router samples pixel locations within a predefined area of the image based on the type to recognize the at least one component.

At 330, the customized image router obtains custom rules for the type and the at least one component.

In an embodiment, at 331, the customized image router receives the custom rules through an interface operated by a retailer associated with a POS terminal.

At 340, the customized image router applies the custom rules to route the image to a first resource and to route the at least one component to a second resource.

According to an embodiment, at 341, the customized image router routes the image to a POS terminal through a USB connection. The POS terminal is the first resource.

In an embodiment, at 342, the customized image router routes the at least one component to an external service over a WAN connection. The external service is the second resource.

Figure 4:
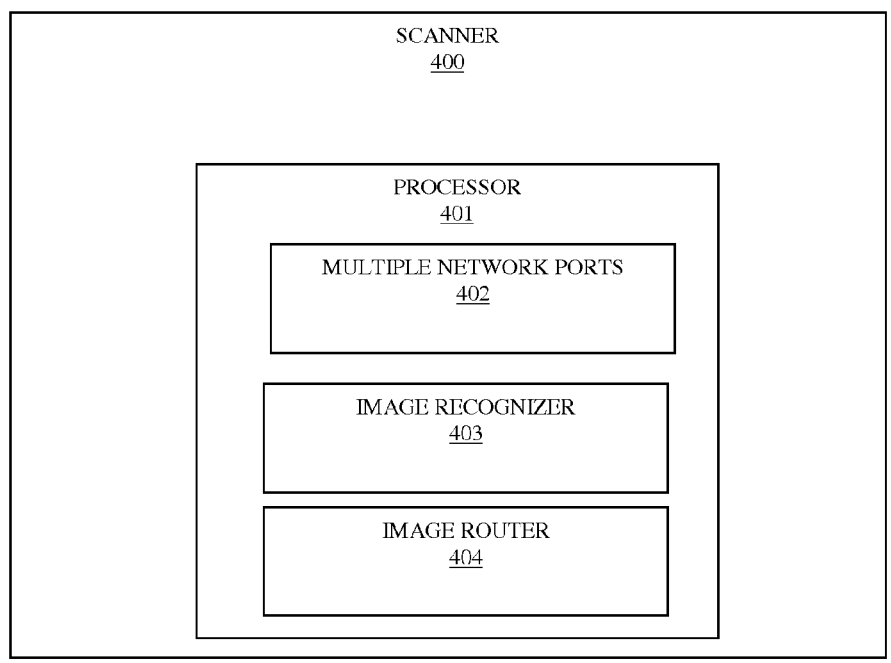
FIG. 4 is a diagram of a scanner, according to an example embodiment.

FIG. 4 is a diagram of a scanner 400, according to an example embodiment. Some components of the scanner 400 are programmed and reside within memory and/or a non-transitory computer-readable medium and execute on one or more processors of the scanner 400. The scanner 400 communicates over multiple networks, which can be wired, wireless, or a combination of wired and wireless.

In an embodiment, the scanner 400 is the scanner 160 of the FIG. 1.

In an embodiment, the scanner 400 is integrated into a POS terminal. In an embodiment the POS terminal is the POS terminal 110 of the FIG. 1. In an embodiment, the POS terminal is a SST. In an embodiment, the SST is an ATM. In an embodiment, the SST is a kiosk. In an embodiment, the POS terminal is a cashier-assisted terminal.

In an embodiment, components of the scanner 400 implement the embodiments discussed above with the FIG. 1.

In an embodiment, components of the scanner 400 implement the embodiments discussed above with the FIG. 2.

In an embodiment, components of the scanner 400 implement the embodiments discussed above with the FIG. 3.

In an embodiment, the components of the scanner 400 implement the embodiments discussed above with respect to the FIGS. 1-3.

The scanner 400 includes a processor 401, multiple network ports 402, an image recognizer 403, and an image router 404.

In an embodiment the image recognizer 403 is the image recognizer and categorizer 161 of the FIG. 1.

In an embodiment, the image router 404 is the rules-based image router 162 of the FIG. 1.

The processor 401 is configured to execute the image recognizer 403 and image router 404 from memory and/or a non-transitory computer-readable storage medium of the scanner 400. In an embodiment, the processor 401 is a special purpose processor.

In an embodiment, the multiple network ports includes: 1) a USB port that directly connects to non-scanner peripherals of the POS terminal to which the scanner 400 is integrated and 2) an Ethernet port that directly connects to a WAN.

In an embodiment, the multiple network ports include: 1) a USB port that directly connects to non-scanner peripherals of the POS terminal to which the scanner 400 is integrated, 2) an Ethernet port that directly connects to a WAN, and 3) an Ethernet port that directly connects to a LAN.

In an embodiment, the multiple network ports includes: 1) a USB port that directly connects to non-scanner peripherals of the POS terminal to which the scanner 400 is integrated and 2) an Ethernet port that directly connects to a WAN and/or LAN through a switch or hub.

The image recognizer 403 is adapted and configured to: i) execute on the processor 401 and ii) classify an image captured by the scanner 400 at a Point-Of-Sale (POS) terminal.

The image router 404 is adapted and configured to: i) execute on the processor 401, ii) apply custom rules for routing the classified image, and iii) select one or more of the multiple network ports 402 for routing the classified image to one or more destination resources in response to applying the custom rules.

In an embodiment, the multiple network ports 402 include a Universal Serial Bus (USB) port and at least one Ethernet port.

In an embodiment, the multiple network ports 402 include a USB port and two Ethernet ports (one for a WAN connection and one for a LAN connection).

In an embodiment, the multiple network ports 402 include a USB port and one Ethernet port connected to a switch or a hub permitting the Ethernet port to connect to a WAN and/or LAN.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
electronically capturing, by a scanner, an image of an item at a Point-Of-Sale (POS) terminal;
classifying, by the scanner, the image;

applying, by the scanner, rules for custom routing the classified image to at least one destination resource, wherein applying further includes applying the rules as custom-defined rules that identifies a classification for the image, identifies component portions of the image, identifies content of any text in the image and matches the identified classification, the component portions, and the text to the at least one destination resource where further processing on the image is needed; and routing by the scanner the image to the at least one destination resource by providing the image and an identification of the least one destination resource to a Secure Input Output Module (SIOM) that is integrated into a motherboard of the scanner within an independent processing environment from the scanner and controlling, by the SIOM, a secure communication session through a custom encrypted session between the scanner and the at least one destination resource and providing, by the SIOM, the image to the at least one destination resource during the secure communication session.

2. The method of claim 1, wherein classifying further includes identifying a type of classified image representing the item.

3. The method of claim 2, wherein identifying further includes recognizing at least one component part of the classified image.

4. The method of claim 3, wherein recognizing further includes performing Optical Character Recognition (OCR) on the at least one component part to obtain content for the at least one component part.

5. The method of claim 4, wherein applying further includes routing the classified image to an external service over an Ethernet connection in response to applying the rules, wherein the external service is one of the at least one destination resources.

6. The method of claim 5, wherein applying further includes routing the content for the at least one component part to a peripheral device integrated into the POS terminal, wherein the peripheral device is a second one of the at least one destination resources.

7. The method of claim 1, wherein applying further includes routing the classified image through a Universal Serial Bus (USB) connection to the POS terminal in response to applying the rules, wherein the POS terminal is one of the at least one destination resources.

8. The method of claim 1, wherein applying further includes routing the classified image through an Ethernet connection to an external Wide-Area Network (WAN) resource in response to applying the rules, wherein the external WAN resource is one of the at least one destination resources.

9. The method of claim 1, wherein applying further includes obtain the rules as customized rules defined by a retailer for the POS terminal.

10. The method of claim 1, wherein applying further includes redacting portions of the classified image out before routing the redacted classified image to the at least one destination resource in response to applying the rules.

11. The method of claim 1, wherein applying further includes routing a first portion of the classified image to a first destination resource and a second portion of the classified image to a second destination resource.

12. The method of claim 11, wherein routing further includes routing the first portion through a Universal Serial Bus connection to the POS terminal and routing the second portion through an Ethernet connection to an external service, wherein the POS terminal is the first destination resource and the external service is the second destination resource.

13. A method, comprising:
classifying, by a scanner, an image representing an item into a type;
recognizing, by the scanner, at least one component within the image based on the type;
obtaining, by a scanner, custom rules for the type and the component;
applying, by a scanner, the customized rules to route the image to a first resource and to route the at least one component to a second resource, wherein applying further includes applying the customized rules as custom-defined rules that identifies the type, identifies at least one component, identifies content of any text in the image and matches the identified type, the at least one component, and the text to the first resource and the second resource where further processing on the image and the at least one component are needed; and
routing by the scanner the image to the first resource and routing by the scanner the at least one component to the second resource, wherein routing further includes by providing the image, the at least one component, and identifications for the first and second resources to a Secure Input Output Module (SIOM) that is integrated into a motherboard of the scanner within an independent processing environment from the scanner and controlling, by the SIOM, secure communication sessions through custom encrypted sessions between the scanner with the first resource and between the scanner with the second resource, and providing the image to the first resource during a first secure communication session and providing the at least one component to the second resource during a second secure communication session.

14. The method of claim 13, wherein classifying further includes sampling pixel locations within the image and comparing those sampled pixel locations against one or more templates to classify the image into the type.

15. The method of claim 13, wherein recognizing further includes sampling pixel locations within a predefined area of the image based on the type to recognize the at least one component.

16. The method of claim 13, wherein obtaining further includes receiving the custom rules through an interface operated by a retailer associated with a Point-Of-Sale (POS) terminal.

17. The method of claim 13, wherein applying further includes routing the image to a Point-Of-Sale (POS) terminal through a Universal Serial Bus Connection, wherein the POS terminal is the first resource.

18. The method of claim 13, wherein applying further includes routing the component to an external service over a Wide-Area Network (WAN) connection, wherein the external service is the second resource.

19. A scanner, comprising:
a processor;
multiple network ports;
an image recognizer;
an image router; and
a Secure Input Output Module;
wherein the image recognizer is configured to: i) execute on the processor and ii) classify an image captured by the scanner at a Point-Of-Sale (POS) terminal, and wherein the image router is configured to: i) execute on the processor, ii) apply custom rules for routing the classified image, and iii) select one or more of the multiple network ports for routing the classified image to one or more destination resources in response to applying the custom rules, wherein ii) further includes apply the custom rules as custom-defined rules that identifies a classification for the image, identifies component portions of the image, identifies content of any text in the image and matches the identified classification, the component portions, and the text to the one or more destination resource where further processing on the image is needed, and routing by the scanner the image to the one or more destination resources, and wherein the image router is configured to interact with the SIOM and identify the image, the component portions of the image, and the multiple network ports associated with the one or more destination resources, wherein the SIOM is integrated into a motherboard of the scanner within an independent processing environment from the scanner and the SIOM is configured to establish secure communication sessions through custom encrypted sessions between the scanner and the one or more destination resources over the multiple network ports and provide the image and the component portions of the image to the one or more destination resources during the secure communication sessions.

20. The image device of claim 19, wherein the multiple network ports include a Universal Serial Bus (USB) port and an Ethernet port.

\* \* \* \* \*